July 22, 1947.     O. A. WIBERG     2,424,378
SAFETY DEVICE FOR RADIAL FLOW ELASTIC FLUID TURBINES
Filed May 4, 1944

Inventor
Oscar A. Wiberg
by Sommers & Young
Attorneys

Patented July 22, 1947

2,424,378

UNITED STATES PATENT OFFICE 2,424,378

SAFETY DEVICE FOR RADIAL FLOW ELASTIC FLUID TURBINES

Oscar Anton Wiberg, Finspong, Sweden

Application May 4, 1944, Serial No. 534,106
In Sweden July 9, 1943

3 Claims. (Cl. 253—16.5)

The present invention relates to elastic fluid turbines of the radial flow type and has for its object to provide a safety device for such turbines whereby, if for some reason a relative excentric movement of an undue amplitude tends to appear between the two turbine halves, said relative movement may be limited so as to positively prevent adjacent blade rings from touching each other.

With this object in view the invention consists, essentially, in the provision in connection with the blade supporting elements of the turbine of means situated at a smaller radius than that of the innermost blade ring for limiting the relative radial movement of said supporting elements to an amount less than the minimum radial play normally existing between adjacent blade rings.

Figure 1:
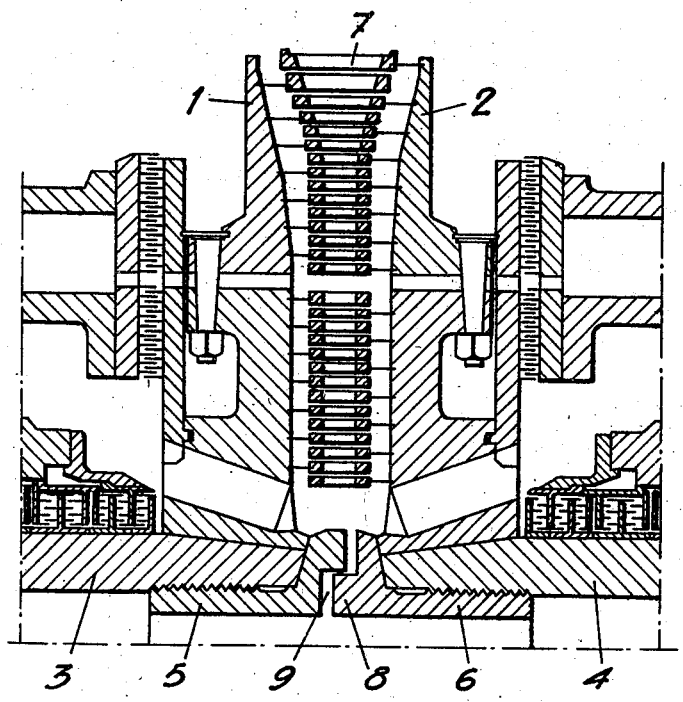
Fig. 1 is an axial section of part of a double rotation radial flow turbine to which an embodiment of the invention has been applied.

In Fig. 1, the numerals 1 and 2 designate two turbine discs adapted for opposite rotation, and 3, 4 are the respective shaft ends for supporting said discs. 5 and 6 are central screws engaging threaded borings of shaft ends 3 and 4 for locking the discs to the shaft ends. 7 designates the turbine blading, the concentric blade rings of which are alternately supported by disc 1 and disc 2.

In accordance with the present invention the locking screw 6 of shaft end 4 is formed at its inner end with a cylindrical projection 8 concentric with the turbine axis. The adjacent inner end of screw 5 is formed with a cylindrical boring 9 likewise concentric with the turbine axis, which is engaged by said cylindrical projection 8. The diameter of projection 8 is somewhat less than that of boring 9 so that a certain radial play appears therebetween. By making said play less than the minimum radial play existing between adjacent blade rings, the latter are positively prevented from touching each other, if for some reason the two turbine halves would tend to perform an excentric movement with relation to each other the amplitude of which exceeds the allowable radial play between the blade rings, the amplitude being positively restricted to the play between the projection 8 and the cylindrical surface of the boring 9.

Figure 2:
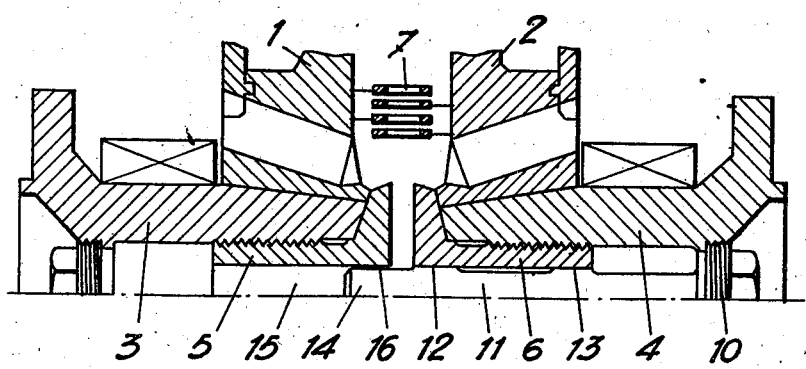
Fig. 2 is an axial section of part of a similar turbine to which another embodiment of the invention has been applied.

In the modified form of the invention illustrated in Fig. 2, the hollow screws 5 and 6 for locking the discs 1, 2 to the respective shaft ends 3, 4, are of well-known design. Here, the fluid-sealing plug 10 screwed into the threaded outermost portion of the boring of screw 6 is formed with a journal-shaped projection 11 engaging the borings of shaft end 4 and screw 6 and snugly fitting in the latter at 12, 13. The free end 14 of journal 11 projects into the boring 15 of screw 5, which it engages with a certain radial play 16, the amount of which is less than the minimum radial play normally existing between adjacent blade rings of blading 7.

Though in the drawing I have illustrated radial flow turbines of the double rotation type, it is to be noted that the invention may also be applied to radial flow turbines of the single rotation type.

What I claim is:

1. In a radial flow elastic fluid turbine having a set of concentric blade rings, two shafts adapted for opposite rotation, two turbine discs each carried by a separate one of said shafts for supporting alternate blade rings, one of said shafts having a threaded boring in its end, a hollow screw engaging said threaded boring of said one shaft end to secure the respective turbine disc thereto, a cylindrical projection concentric to the turbine axis formed on the inner end of said screw, and a screw to secure the other disc to its shaft, said last-mentioned screw having a boring in its end toward the first-mentioned screw, the boring of said last-mentioned screw accommodating the projection of said first-mentioned screw with a radial play less than the minimum radial space existing between adjacent blade rings.

2. In a radial flow elastic fluid turbine, the combination of two shafts having hollow shaft ends and adapted for opposite rotation, said shaft ends each having a through-extending boring which is threaded along a portion of its length, two turbine discs carried by the hollow ends of said shafts, concentric blade rings carried alternately by one and the other of said discs, screws engaging the threaded portions of said hollow shaft ends to seal the turbine discs to the shaft ends, said screws having longitudinal through-extending borings, and a journal or pin inserted without radial play in the boring of one of said screws so as to fit snugly therein, one end of said journal or pin projecting into the boring of the other screw so as to engage same with a radial play less than the minimum radial play normally appearing between the blade rings of one turbine disc and the adjacent blade rings of the other disc.

3. In a radial flow elastic fluid turbine, concentric blade rings, two oppositely rotatable turbine discs carrying alternate ones of said blade rings with adjacent blade rings spaced from each other to a predetermined degree, two separate, hollow shaft ends, each carrying an individual one of said discs, and central hollow screws in the adjacent ends of said shaft ends for securing the discs to the shaft ends, said screws being provided with radial stop members arranged for engagement with each other for positively preventing adjacent blade rings from touching each other while allowing a radial play between the shaft ends which is less than the minimum radial gap normally existing between adjacent blade rings.

OSCAR ANTON WIBERG.

REFERENCES CITED

The following references are of record in the file of this patent:

UNITED STATES PATENTS

| Number | Name | Date |
|---|---|---|
| 600,007 | Langer | Mar. 1, 1898 |
| 807,057 | Brady | Dec. 12, 1905 |
| 1,003,144 | Loftus | Sept. 12, 1911 |
| 1,695,751 | Wiberg | Dec. 18, 1928 |

FOREIGN PATENTS

| Number | Country | Date |
|---|---|---|
| 611,800 | Germany | Apr. 6, 1935 |